US008897351B2

(12) United States Patent
Kravtsov

(10) Patent No.: US 8,897,351 B2
(45) Date of Patent: Nov. 25, 2014

(54) METHOD FOR PEAK TO AVERAGE POWER RATIO REDUCTION

(75) Inventor: Vladimir Kravtsov, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 1099 days.

(21) Appl. No.: 12/888,764

(22) Filed: Sep. 23, 2010

(65) Prior Publication Data
US 2012/0076250 A1 Mar. 29, 2012

(51) Int. Cl.
H03H 7/30 (2006.01)
H03D 1/04 (2006.01)
H04L 25/03 (2006.01)
H04L 27/26 (2006.01)

(52) U.S. Cl.
CPC ...... H04L 27/2623 (2013.01); H04L 25/03834 (2013.01)
USPC .......................... 375/229; 375/346; 375/350

(58) Field of Classification Search
USPC .................... 381/94.2–94.3, 94.7, 71.14; 375/229–236, 240.26–240.27, 240.29, 375/295, 316, 340, 346, 35
See application file for complete search history.

(56) References Cited

U.S. PATENT DOCUMENTS

| 5,241,538 | A  | * | 8/1993 | Kanno et al. | 370/201 |
|---|---|---|---|---|---|
| 6,130,916 | A  | * | 10/2000 | Thomson | 375/285 |
| 8,582,976 | B2 | * | 11/2013 | Boyd | 398/158 |
| 2005/0286641 | A1 | * | 12/2005 | Cao | 375/240.26 |
| 2008/0137871 | A1 | * | 6/2008 | Hanna | 381/23 |
| 2010/0316140 | A1 | * | 12/2010 | Razazian et al. | 375/257 |

FOREIGN PATENT DOCUMENTS

EP 0940925 A1 9/1999

OTHER PUBLICATIONS

Kevin Huang, "Reducing The Peak-to-Average Power Ratio in OFDM," SUID: 05118478, Email: kevhuang@standford.edu, Dec. 5, 2003.
Ing. Zbynek Fedra, "Reduction of PAPR in OFDM by Clipping," Doctoral Degree Programme (1), Dept. of Radio Electronics, FEEC, BUT, E-mail: xfedra01@stud.feec.vutbr.cz.
Jack E. Volder, "The CORDIC Trigonometric Computing Technique," The Institute of Radio Engineers, Inc. (now The Institute of Electrical and Electronics Engineers, Inc.), May 25, 1959, pp. 226-230, San Francisco, CA.
Afsahi et al., "Fully Integrated Dual-Band Power Amplifiers with on-chip Baluns in 65nm CMOS for an 802.11n MIMO WLAND SoC," 2009 IEEE Radio Frequency Integrated Circuits Symposium, RTU1A-2, Center for Wireless Communications, University of California, San Diego, La Jolla, CA.
Kimura et al., "PAR Reduction for OFDM signals based on Deep Clipping," 2008 IEEE, ISCCP 2008, Malta, Mar. 12-14, 2008.
Armstrong, "Peak-to-average power reduction for OFDM by repeated clipping and frequency domain filtering," Electronics Letters, Feb. 28, 2002, vol. 38, No. 5, pp. 246-247.

(Continued)

Primary Examiner — Sam K Ahn
Assistant Examiner — Linda Wong
(74) Attorney, Agent, or Firm — Schwabe, Williamson & Wyatt, P.C.

(57) ABSTRACT

According to various embodiments, methods, apparatuses and systems are provided to allow a transmitter to reduce the Peak to Average Power Ratio (PAPR) of a modulated signal by applying a pre-emphasis filter to the signal, clipping the pre-distorted signal to reduce the PAPR, and applying a de-emphasis filter to the clipped signal to reduce the spectral leakage caused by the clipping. Other embodiments may be disclosed or claimed.

16 Claims, 6 Drawing Sheets

(56) References Cited

OTHER PUBLICATIONS

Zhang et al., "Peak-to-Average Power Ratio Reduction in an FDM Broadcast System," 2007 IEEE, SiPS 2007, Department of Electrical Engineering and Computer Sciences, University of California, Berkley.

An et al., "A 2.4 GHz Fully Integrated Linear CMOS Power Amplifier With Discrete Power Control," IEEE Microwave and Wireless Components Letters, vol. 19, No. 7, Jul. 2009.

Wongkomet et al., "A +31.5 dBm CMOS RF Doherty Power Amplifier for Wireless Communications," IEEE Journal of Solid-State Circuits, vol. 41, No. 12, Dec. 2006.

Degani et al., "A 90-nm CMOS Power Amplifier for 802.16e (WiMAX) Applications," IEEE Transactions on Microwave Therory and Techniques, vol. 58, No. 5, May 2010.

Aoki et al., "A Fully-Integrated Quad-Band GSM/GPRS CMOS Power Amplifier," IEEE Journal of Solid-State Circuits, vol. 43, No. 12, Dec. 2008.

Chang et al., "A Fully Integrated RF Front-End with Independent RX/TX Matching and +20dBm Output Power for WLAN Applications," 2007 IEEE International Solid-State Circuits Conference, ISSCC 2007 / Session 31 / WLAN / BLUETOOTH / 31.4, Atheros Communications, Santa Clara, CA, Standford University, Standford, CA.

An et al., "A Monolithic Voltage-Boosting Parallel-Primary Transformer Structures for Fully Integrated CMOS Power Amplifier Design," 2007 IEEE Radio Frequency Integrated Circuits Symposium, Georgia Electronic Design Center, Georgia Institute of Technology, Atlanta,, GA, Samsung RFIC Design Center, Atlanta, GA.

Ruberto et al., "A Reliability-Aware RF Power Amplifier Design for CMOS Radio Chip Integration," IEEE CFPO8RPS-CDR 46th Annual International Reliability Physics Symposium, Phoenix, 2008.

Kang et al., "A Single-Chip Linear CMOS Power Amplifier for 2.4 GHz WLAN," 2006 IEEE International Solid-State Circuits Conference, ISSCC 2006 / Session 11 / RF Building Blocks and PLLS / 11.9, Pohang University of Science and Technology, Pohang, Korea, California Institute of Technology, Pasadena, CA.

Zhu et al., "An Adaptive Volterra Predistorter for the Linearization of RF High Power Amplifiers," 2002 IEEE MTT-S Digest, IF-TU-23, Department of Electronic and Electrical Engineering, University College Dublin, Dublin 4, Ireland.

He et al., "An Improved Look-Up Table Predistortion Technique for HPA With Memory Effects in OFDM Systems," IEEE Transactions on Broadcasting, vol. 52, No. 1, Mar. 2006.

Hill et al., "Comparison of Low Complexity Clipping Algorithms for OFDM," 2002 IEEE, PIMRC 2002, Centre for Telecommunications and Micro-Electronics, Victoria University, Melbourne, Australia.

Zhu et al., "Digital Predistortion for Envelope-Tracking Power Amplifiers Using Decomposed Piecewise Volterra Series," IEEE Transactions on Microwave Theory and Techniques, vol. 56, No. 10, Oct. 2008.

Jin et al., "Fully-integrated CMOS Power Amplifier Design for WiMAX Application with Semi-lumped Transformer," Electrical and electronics department, Pohang University of Science and Technology, Republic of Korea, Electrical and electronics department, Harbin Institute of Technology, China, pp. 181-185.

* cited by examiner

METHOD FOR PEAK TO AVERAGE POWER RATIO REDUCTION

TECHNICAL FIELD

The present disclosure generally relates to transmission of signals and, in particular, to reducing peak to average power ratio of modulated signals.

BACKGROUND

Multicarrier transmission schemes, such as Orthogonal Frequency Division Multiplexing (OFDM), may use a number of orthogonal subcarriers to carry data. The superposition of the orthogonal subcarriers may lead to large peaks in the magnitude of the signal, which may be measured as Peak to Average Power Ratio (PAPR), and commonly expressed in decibels (dB). In case of Single-Carrier Frequency Division Multiple Access (SC-FDMA) modulation, superposition of very long symbol pulses may also lead to increased PAPR.

To transmit a modulated radio signal, the base-band (BB) complex digital signal may be converted into an analog signal with digital-to-analog converter (DAC), then frequency-shifted into a radio frequency band centered at a radio carrier, and amplified by a power amplifier (PA). If the BB digital signal has a large PAPR, without having a large back-off (defined as the ratio of PA's saturation power/average PA power) value in the PA, the signal peaks may be distorted, and the signal may have spectral leaks into adjacent channels. These spectral leaks, also known as out-of-band transmissions, may be undesirable and may be prohibited by transmission control authorities of various countries and regions, such as the Federal Communications Commission (FCC) of the United States of America. However, having a large PA back-off value may degrade PA efficiency and output power.

The PAPR of the BB signal may be reduced by a digital "clipping" (which may include limiting magnitude of the signal samples while preserving their phases) process, followed by a digital low pass filter (LPF) suppressing the spectral leaks resulting from the clipping. However, the LPF filtering may have the adverse effect of increasing the peak magnitude, and consequently, the PAPR, of the signal, thereby reversing at least part of the PAPR reduction done by the clipping. As such, the clipping and LPF-filtering may need to be repeated several times in order to achieve the desired PAPR reduction. Such an iterative process may be expensive, or otherwise impractical for various reasons.

BRIEF DESCRIPTION OF THE DRAWINGS

Embodiments of the present disclosure will be described by way of exemplary illustrations, but not limitations, shown in the accompanying drawings in which like references denote similar elements, and in which.

DETAILED DESCRIPTION OF ILLUSTRATIVE EMBODIMENTS

In the following detailed description, reference is made to the accompanying drawings which form a part hereof, and in which are shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

According to various embodiments, methods, apparatuses and systems are provided to allow a transmitter to reduce the PAPR of a signal (e.g. OFDM-modulated or SC-FDMA modulated) by applying a pre-emphasis filter to the signal, clipping the signal to reduce the PAPR, and applying a de-emphasis filter to reduce the spectral leakage caused by the clipping. These and other aspects of various embodiments will be described in greater details below.

Figure 1:
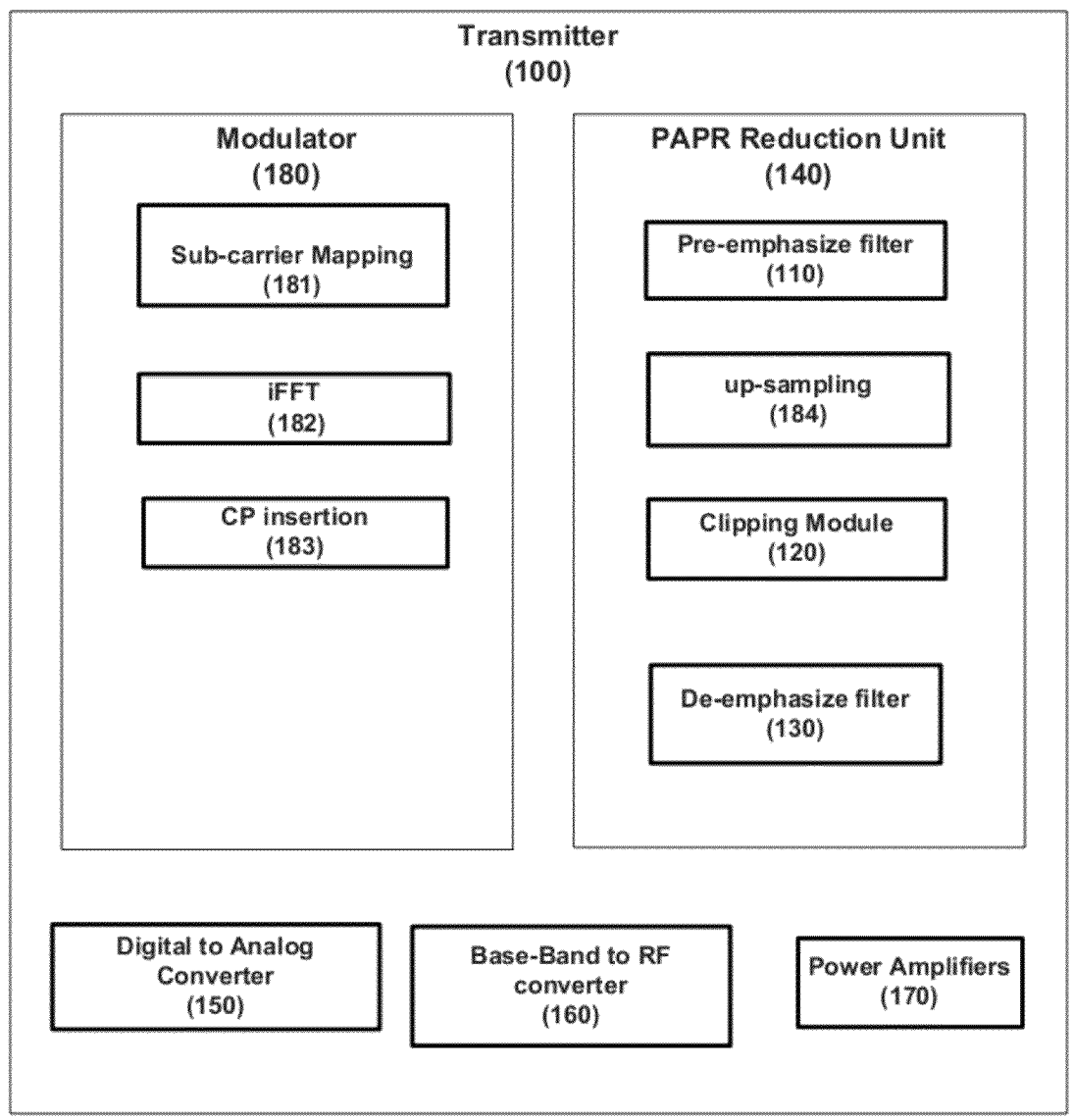
FIG. 1, is a block diagram illustrating an example embodiment of a transmitter in accordance with various embodiments.

FIG. 1 is a block diagram illustrating an example embodiment of a transmitter in accordance with various embodiments. As illustrated, for various embodiments, a transmitter 100 may include a modulator 180 having a sub-carrier mapping component 181, PAPR reduction unit 140, a digital analog converter (DAC) 150, an up-converter 160 and one or more power amplifiers 170. Although the components shown in FIG. 1 are depicted as separate blocks within the transmitter 100, the functions performed by some of these blocks may be integrated within a single semiconductor circuit or may be further subdivided into more separate integrated circuits.

In various embodiments, the PAPR reduction unit 140 may include a pre-emphasis filter 110, a clipping module 120, and a de-emphasis filter 130. While FIG. 1 depicts PAPR reduction unit 140 having connected sub-units, in various embodiments of OFDM and/or SC-FDMA transmitters, the pre-emphasis filter 110 may be coupled to the clipper 120 through modulator's sub-modules. In various embodiments, the pre-emphasis filter 110 may be coupled to the clipper 120 through an inverse Fast Fourier transformer 182, a cyclic prefix (CP) insertion module 183, and an up-sampling module 184 of the Modulator 180. Although FIG. 1 illustrates various components for the PAPR reduction unit 140, one or more components may be optional. In one example, the PAPR reduction unit 140 may not have an up-sampling module 184.

Figures 2A, 2B:
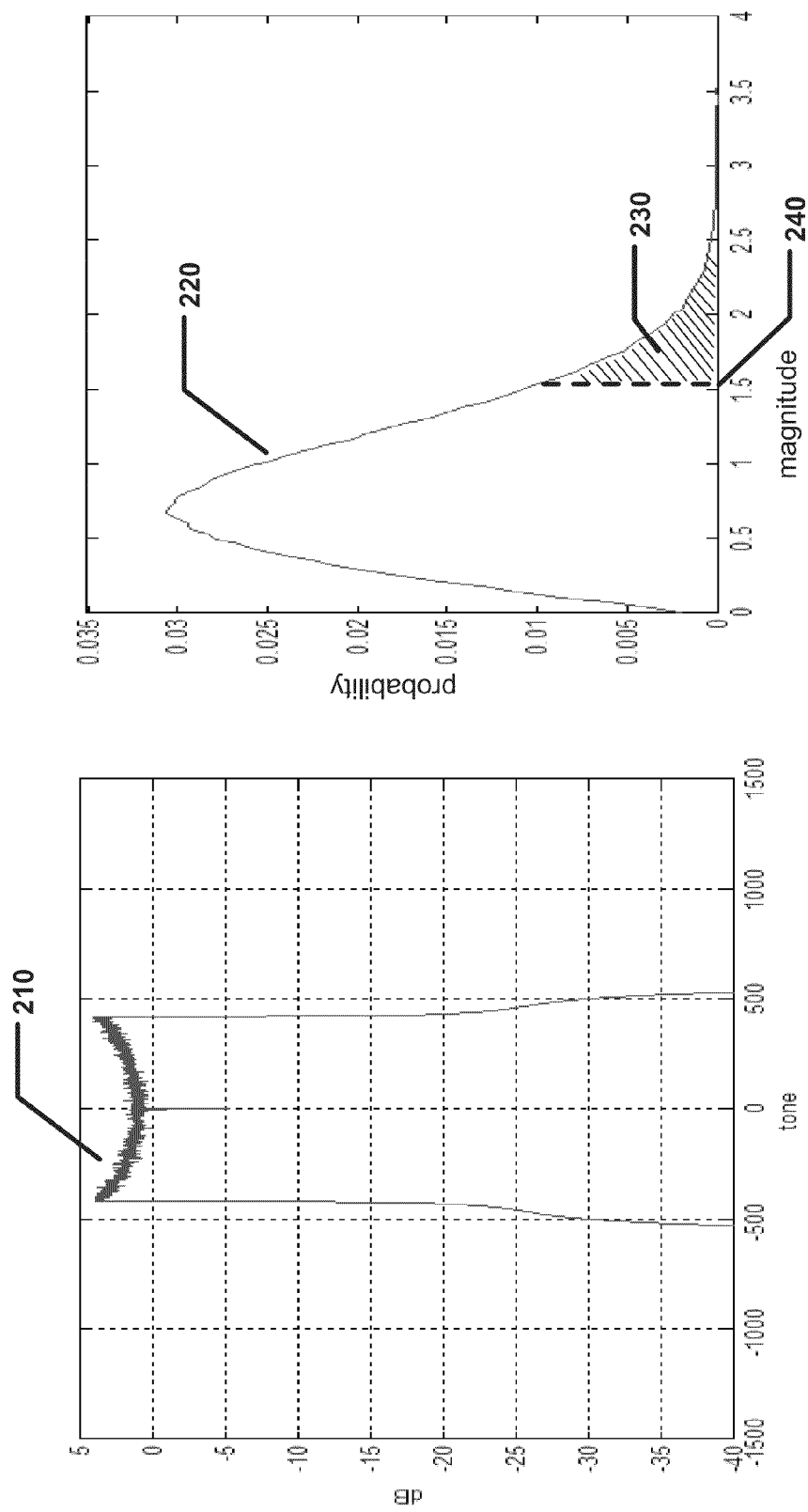
FIG. 2a illustrates an example spectrum of an OFDM-modulated signal after filtering by a pre-emphasis filter, in accordance with various embodiments.
FIG. 2b illustrates an example histogram of magnitude of the OFDM-modulated signal after filtering by the pre-emphasis filter, in accordance with various embodiments.

FIG. 2a illustrates an example spectrum of an OFDM signal after filtering by a pre-emphasis filter, such as the pre-emphasis filter 110 illustrated in FIG. 1, in accordance with various embodiments.

In FIG. 2a, as illustrated, the BB signal may have a power spectrum density (PSD) 210. The BB signal may be mapped to sub-carriers (tones), and the sub-carriers may form in-band portion of the signal. The BB signal may be mapped to the tones from −420 to 420, with near 11 KHz tone spacing. As illustrated, in FIG. 2a, the in-band portion of the BB signal may be from about −420 tones to about 420 tones. Therefore, the in-band portion of the signal may be from the carrier frequency ($F_{carrier}$)−420*11 KHz to $F_{carrier}$+420*11 KHz. Frequency intervals from negative sampling frequency ($F_{sample}$)/2 to −421 and from 421 to $F_{sample}$/2 may form out-of-band portion of the BB signal. Prior to being filtered by the pre-emphasis filter 110, the spectrum of the input signal may be about flat across the in-band frequency range. After filtering by the pre-emphasis filter 110, the spectrum 210 of the pre-distorted signal may have a concave shape within the in-band portion of the spectrum, e.g., the magnitude of a sub-carrier close to the edge of the in-band may be higher than the magnitude of a sub-carrier close to zero frequency.

While FIG. 2a depicts the OFDM signal from −420 tones to 420 tones, in various embodiments, the in-band of the signal may be narrower or wider, the sampling rate ($F_{sample}$) and the out-of-band area may vary in various embodiments. Furthermore, the shape of the spectrum 210, as illustrated in FIG. 2a, is for purpose of illustration. In various embodiments, the pre-emphasis filter 110 may cause the spectrum 210 to resemble any shape or form, so long as the spectrum of the transmitted signal is properly shaped after filtering by the de-emphasis filter 130, as it will be described in more detail below.

FIG. 2b illustrates an example histogram of the OFDM signal after filtering by the pre-emphasis filter 110, in accordance with various embodiments. In FIG. 2b, as illustrated, a histogram 220 may represent the probabilities of the various magnitudes of the signal samples. In various embodiments, the pre-emphasis filter 110 may be coupled to a PA having a back-off (BO) value 240 around 1.5, or about 3.5 dB. The histogram may therefore have a shaded area 230 which represents the samples with magnitude higher than 1.5 times the root mean square (RMS) value. The higher the PAPR of the signal, the bigger shaded area 230 may be, and the more likely a sample will be distorted by the PA with a BO 240. Therefore, in order to enable transmission with small PA back-off, the PAPR of the BB signal may need to be reduced.

In various embodiments, the clipping module 120 may limit the magnitude of the signal samples to a pre-determined threshold based on the ratio of instant signal magnitude to its RMS value. Resultantly, after clipping, the signal may have a pre-determined PAPR. In various embodiments, this pre-determined PAPR may be adjusted accordingly. To limit magnitude of a complex sample while preserving its phase, the clipping module 120 may use any algorithm, e.g. Coordinate Rotation Digital Computer (CORDIC). The clipped BB signal, however, may have one or more out-of-band spectral components, which may be measured by signal PSD in out-of-band area.

Figure 3B:
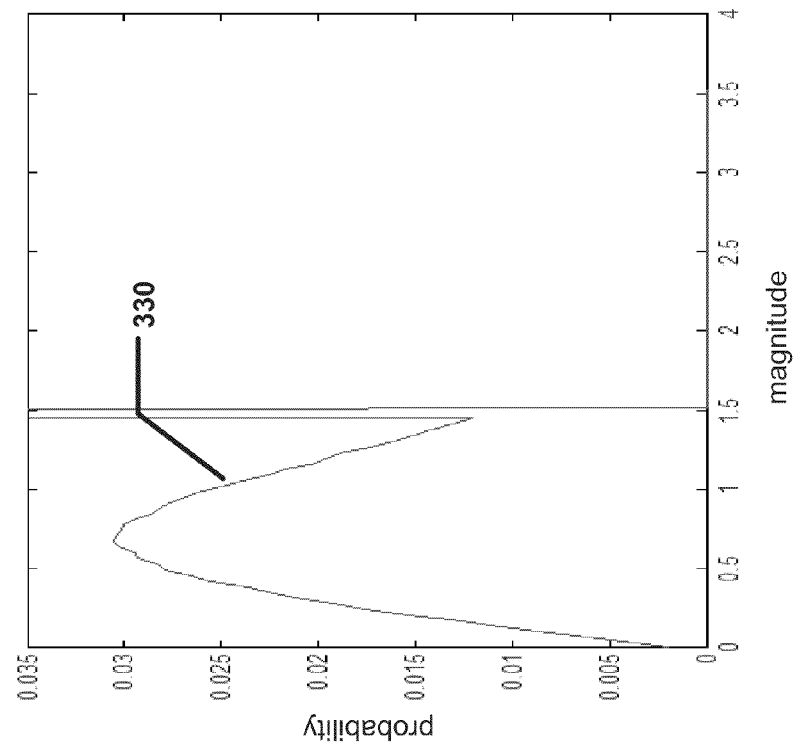
FIG. 3b illustrates an example histogram of magnitude of the signal after clipping by the clipping module, in accordance with various embodiments.
Figure 3A:
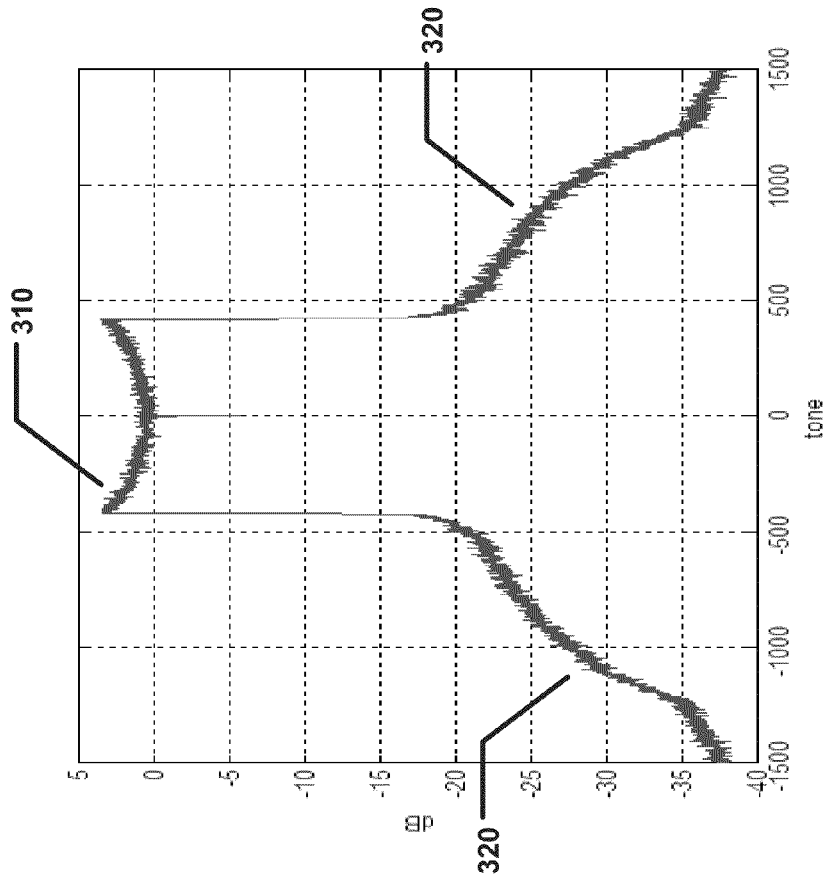
FIG. 3a illustrates an example spectrum of the signal after clipping by the clipping module, in accordance with various embodiments.

FIG. 3a illustrates an example spectrum of the OFDM signal after clipping by a clipping module, such as the clipping module 120 illustrated in FIG. 1, in accordance with various embodiments. FIG. 3b illustrates an example histogram of the signal after clipping by the clipping module 120, in accordance with various embodiments. Prior to clipping, the signal may be one that was filtered by the pre-emphasis filter 110, and may have PSD similar to the spectrum 210 illustrated in FIG. 2a, which may be equal to zero in out-of-band areas. After the clipping, the signal may have a histogram 330 and a spectrum 310. Clipping may reduce the PAPR of the signal, as illustrated by the histogram 330 not having a shaded area similar to the shaded area 230 illustrated in FIG. 2b. However, clipping may also introduce out-of-band emission, as illustrated by the spectrum 310 having a skirt 320, from about −1500 tones to about −500 tones, and from about 500 tones to about 1500 tones.

In various embodiments, the de-emphasis filter 130 may be a finite impulse response (FIR) filter, such as a tapped delay line. The de-emphasis filter 130 may reduce out-of-band emission caused by the clipping module 120. The de-emphasis process may increase the PAPR slightly. However, this PAPR increase may be negligible, or tolerable, due to impulse response (IR) of the de-emphasize filter 130 being much shorter than that of a LPF. The de-emphasis filter 130 may have a Frequency Response (FR) with near null values at the critical frequencies, thereby minimizing out-of-band emission at about critical offsets from the carrier frequency. In some embodiments, the critical frequencies and/or critical offsets may be derived from the spectral masks defined in regulations or in communication standards.

In various embodiments, rather than having a flat in-band frequency response (FR) like the LPF, the de-emphasis filter 130 may have a FR that has a bell-shaped curve (ripples) within the in-band portion of the signal. A bell-shaped FR may produce shorter IR and therefore creating smaller increase of PAPR than that caused by the LPF. Furthermore, these in-band ripples may be corrected by the pre-distortion applied to the signal by the pre-emphasis filter 110. In other words, the de-emphasis filter 130 may reverse the in-band distortion caused by the pre-emphasis filter 110, while reducing the out-of-band spectral leakage caused by the clipping module 120. As such, the composite FR of the pre-emphasis filter 110 and the de-emphasis filter 130 may produce an output signal with a flat, or otherwise properly shaped, in-band spectrum. Accordingly, the transfer function for the pre-emphasis filter 110 may be determined based on the in-band FR of the de-emphasis filter 130. In one embodiment, the in-band portion of the transfer function of the pre-emphasis filter 110 may be the inverse function of the in-band portion of the transfer function of the de-emphasis filter 130.

In various embodiments, out-of-band portion of the transfer function of the de-emphasis filter 130 may be arbitrary, as the signal's out-of-band component may be equal to zero.

Figure 4B:
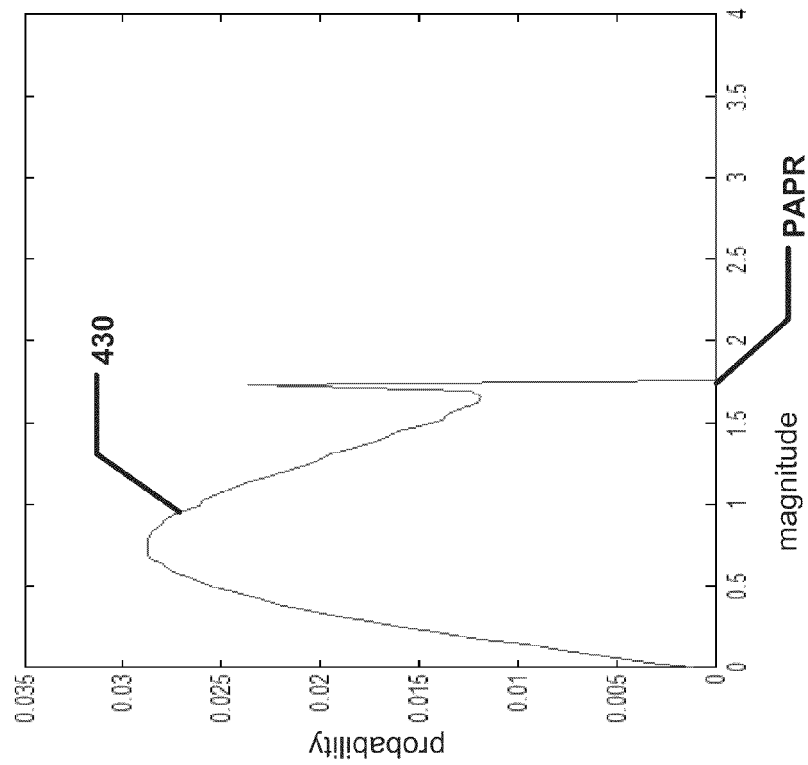
FIG. 4b illustrates an example histogram of magnitude of the signal after filtering by the de-emphasis filter, in accordance with various embodiments.
Figure 4A:
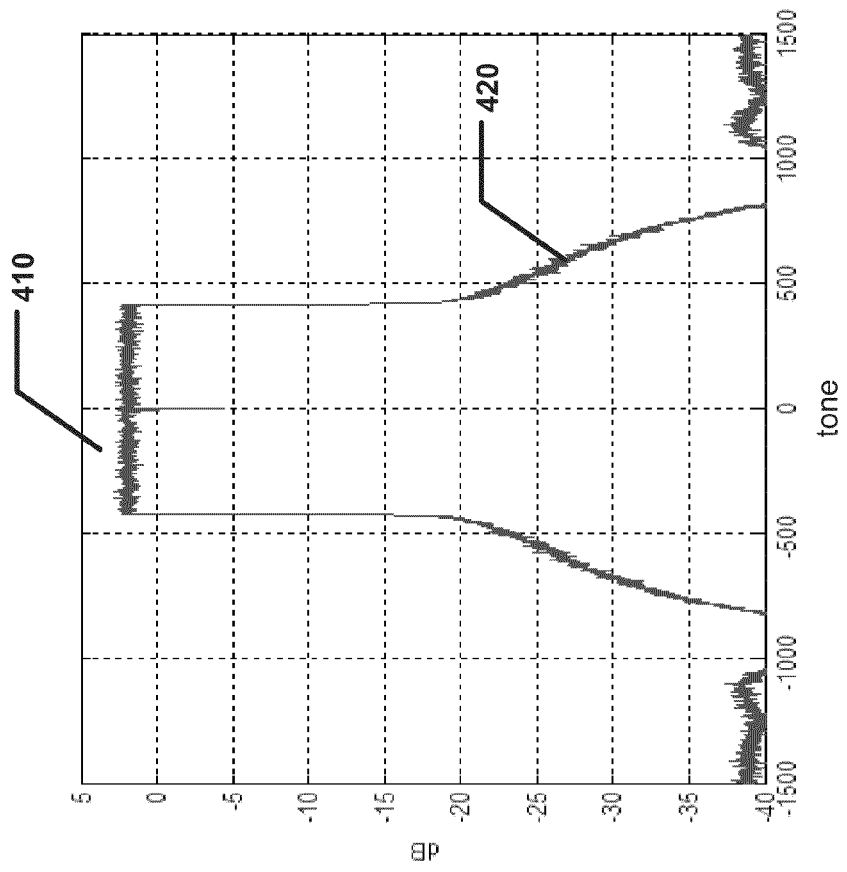
FIG. 4a illustrates an example spectrum of the signal after filtering by a de-emphasis filter, in accordance with various embodiments.

FIG. 4a illustrates an example spectrum of OFDM signal after filtering by a de-emphasis filter, such as the de-emphasis filter 130 illustrated in FIG. 1, in accordance with various embodiments. After filtering by the de-emphasis filter 130, the signal may have a spectrum 410. In certain embodiments, the spectrum 410 may have a flat shape in-band, illustrated as from about −420 tones to about 420 tones. The spectrum 410 may still have some spectral leakage, illustrated as a skirt 420. However, the spectral leakage beyond the critical frequencies, which are illustrated as about −900 tones and about 900 tones, may be at a level negligible or tolerated under the communication standard and/or the regulation. In various embodiments, the locations of the critical frequencies may vary, depending on the standard and/or the regulation. In various embodiments, the shape of the spectrum 410 may not be about flat, so long as it is properly shaped.

FIG. 4b illustrates an example histogram of the OFDM signal after filtering by the de-emphasis filter 130, in accordance with various embodiments. After filtering by the de-emphasis filter 130, the signal may have a histogram 430, with the PAPR at around 1.75, or about 4.8 dB. Such a signal may be transmitted with a linearized PA having a back-off less than 5 dB. Therefore, in various embodiments, a single cycle of pre-emphasizing, clipping and de-emphasizing may be adequate in bringing the PAPR of the signal close to a desirable level and/or to its theoretical lower bound. In yet some other embodiments, the combination of pre-emphasizing, clipping and de-emphasizing may be repeated several times.

Although FIGS. 2-4 illustrates examples using an OFDM modulated signal, the transmitter as disclosed may be used for some other types of modulated digital signal, such as a SC-FDMA modulated signal.

Figure 5:
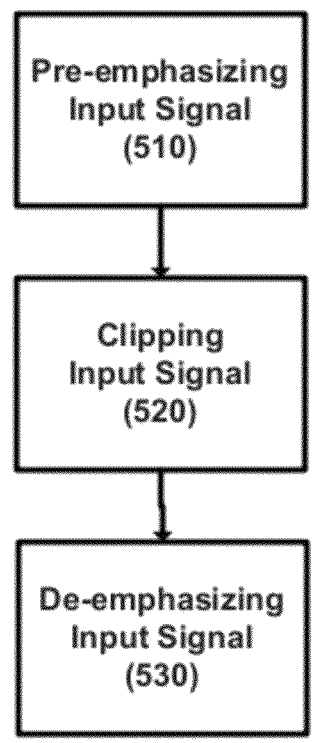
FIG. 5 is a flow diagram illustrating a portion of an example operation of the transmitter in accordance with various embodiments.

FIG. 5 is a flow diagram illustrating a portion of an example operation of the PAPR reduction block 140 in accordance with various embodiments. The pre-emphasis filter 110 may apply a first distortion filter (pre-emphasis) to the signal in block 510. The clipping module 120 may reduce the PAPR of the signal in block 520. The de-emphasis filter 130 may apply a second distortion filter (de-emphasis) to the signal to reduce the spectral leakage and reverse the distortion caused by the pre-emphasis filter, while maintaining the PAPR at an acceptable level, in block 530. While FIG. 5 depicts specific operations in PAPR reduction block, the transmitter 100 may perform other operations, such as converting the signal from frequency domain to time domain by iFFT, up-sampling, and/or power amplifying, etc.

The PAPR reduction block 140 may increase power and efficiency of various transmitters 100, including wireless transmitters, by reducing the PAPR of the signal. Furthermore, the transmitter 100 may increase power class and coverage area, and may improve battery life of various products based on Wireless Fidelity (WiFi), Worldwide Interoperability for Microwave Access (WiMax), 3rd Generation (3G) and Long Term Evolution (LTE) technologies, etc. The transmitter 100 may also be beneficial in order to comply with band edge regulations.

Figure 6:
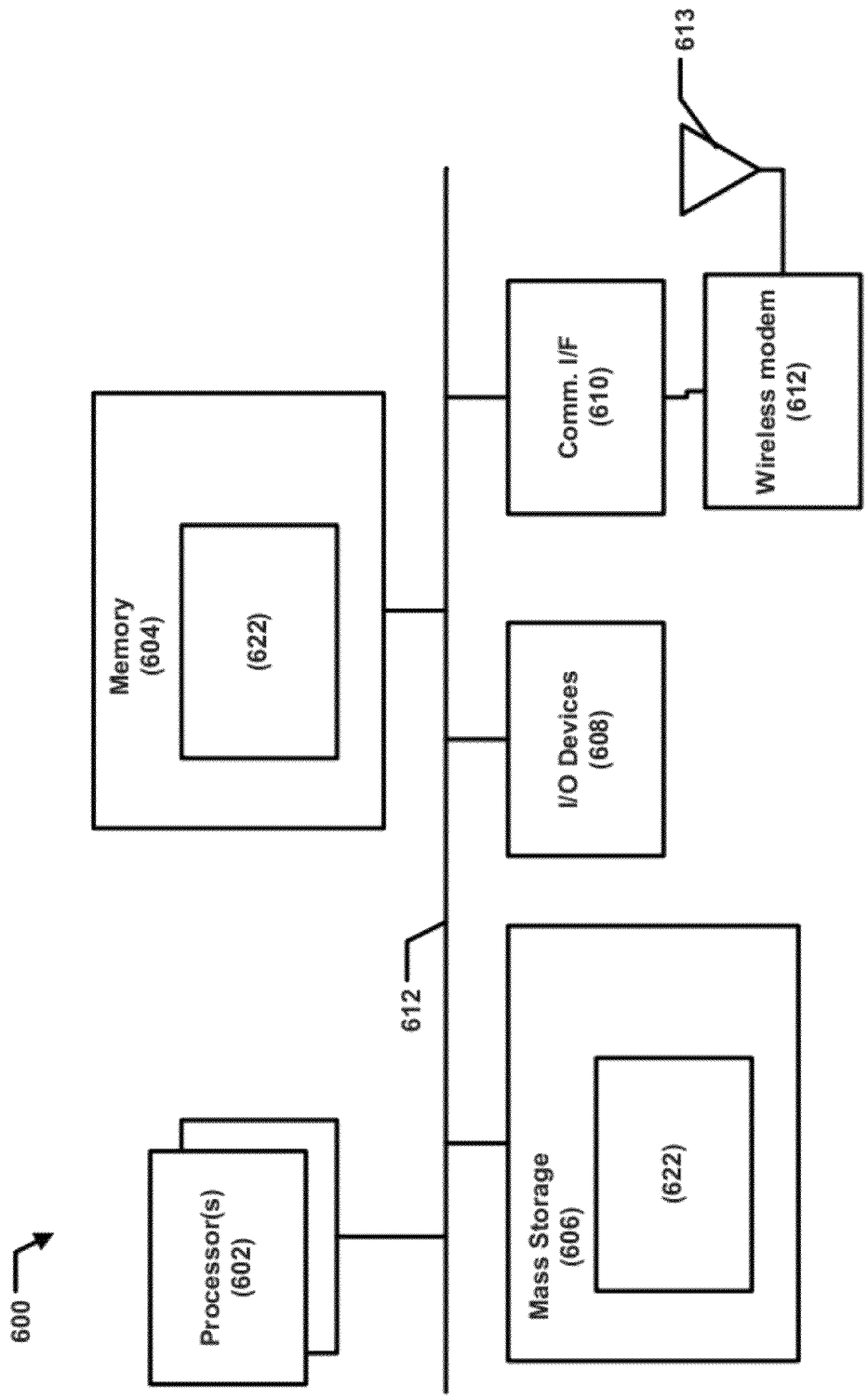
FIG. 6 illustrates an example computer system suitable for use to practice various embodiments of the present invention.

FIG. 6 illustrates an example computer system suitable for use to practice various embodiments of the present invention. As shown, a computing system 600 may include a number of processors or processor cores 602, a system memory 604, a communication interface 610, wireless transceiver 612 and an antenna 613 coupled to the wireless transceiver 612. For the purpose of this application, including the claims, the terms "processor" and "processor cores" may be considered synonymous, unless the context clearly requires otherwise.

In various embodiments, the wireless transceiver 612 may contain a receiver and at least part of the transmitter as previously illustrated, including a pre-emphasis filter, a clipping module and a de-emphasis filter. The communication interface 610 may receive and/or transmit data via the receiver and the transmitter, respectively, over a wired and/or wireless network. The antenna 613 may include one or more directional or omni-directional antennas such as dipole antennas, monopole antennas, patch antennas, loop antennas, microstrip antennas, and/or other types of antennas suitable for transmission of RF signals. Although FIG. 6 depicts a single antenna, the computing system 600 may include additional antennas. For example, the computing system 600 may include a plurality of antennas to implement a multiple-input-multiple-output (MIMO) system.

Additionally, the computing system 600 may include one or more tangible non-transitory mass storage devices 606 (such as diskette, hard drive, compact disc read only memory (CDROM) and so forth), input/output devices 608 (such as keyboard, cursor control and so forth). The elements may be coupled to each other via system bus 612, which represents one or more buses. In the case of multiple buses, they are bridged by one or more bus bridges (not shown).

Each of these elements may perform its conventional functions known in the art. In particular, the system memory 604 and the mass storage 606 may be employed to store a working copy and a permanent copy of the programming instructions implementing one or more operating systems, drivers, applications, and so forth, herein collectively denoted as 622.

The permanent copy of the programming instructions may be placed into the permanent storage 606 in the factory, or in the field, through, for example, a distribution medium (not shown), such as a compact disc (CD), or through the communication interface 610 (from a distribution server (not shown)). That is, one or more distribution media having an implementation of the agent program may be employed to distribute the agent and program various computing devices.

The remaining constitution of these elements 602-612 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A wireless transmitter including circuitry to process a signal prior to wireless transmission of the signal, the circuitry comprising:
    a digital pre-emphasis filter configured to receive the signal within a frequency band, and to apply a distortion to the signal;
    a clipping module, coupled to the digital pre-emphasis filter, configured to reduce magnitude of components of the signal that are above a predefined threshold;
    a de-emphasis filter, coupled to the clipping module, configured to reduce spectral leakages in the signal outside of the frequency band caused by the clipping module, and reverse the distortion of the signal caused by the digital pre-emphasis filter within the frequency band; and a digital to analog converter, coupled to the de-emphasis filter, configured to convert the signal after de-emphasis by the de-emphasis filter.

2. The wireless transmitter of claim 1, wherein the digital pre-emphasis filter is configured to have an in-band portion of a frequency response of the digital pre-emphasis filter about equal to a reverse function of an in-band portion of a frequency response of the de-emphasis filter.

3. The wireless transmitter of claim 1, wherein the digital pre-emphasis filter is configured to apply the distortion to the signal by multiplication of the signal with a transfer function in a frequency domain.

4. The wireless transmitter of claim 1, wherein the de-emphasis filter is configured to reduce out-of-band spectral components of the signal.

5. The wireless transmitter of claim 1, wherein the de-emphasis filter is a finite impulse response (FIR) filter including a tapped delay line.

6. The wireless transmitter of claim 1, wherein a frequency response of the digital pre-emphasis filter is based on a frequency response of the de-emphasis filter.

7. The wireless transmitter of claim 1, wherein a frequency response of the de-emphasis filter combined with a frequency response of the digital pre-emphasis filter results in a flat composite frequency response in the frequency band occupied by the signal.

8. A method for processing, by circuitry of a wireless transmitter, a signal prior to wireless transmission of the signal by the wireless transmitter, the method comprising:
receiving the signal, wherein the signal is a digital signal and occupies a frequency band;
applying a pre-emphasis filter to the signal to distort the signal;
limiting magnitudes of components of the signal that are above a predefined threshold;
after applying the pre-emphasis filter to the signal and after limiting magnitudes of components of the signal that are above the predefined threshold, applying a de-emphasis filter to the signal to reduce out-of-band emission caused by said limiting, and reverse the distortion of the signal caused by the digital pre-emphasis filter within the frequency band; and
after applying the de-emphasis filter to the signal, converting the signal from digital to analog form.

9. The method of claim 8, wherein the pre-emphasis filter has a frequency response within the frequency band about equal to a reverse function of an in-band portion of a frequency response of the de-emphasis filter.

10. The method of claim 8, wherein applying the de-emphasis filter includes applying the de-emphasis filter to compensate for a distortion applied to the signal by the pre-emphasis filter.

11. The method of claim 8, wherein applying the pre-emphasis filter to the signal includes multiplying the signal by a transfer function in a frequency domain.

12. The method of claim 8, wherein applying the de-emphasis filter includes applying a filter based on a finite impulse response (FIR) filter.

13. A system comprising:
an antenna; and
a transmitter coupled to the antenna to transmit data over a wireless network, the transmitter including circuitry to process a signal prior to wireless transmission of the signal, wherein the signal is a digital signal, the circuitry comprising:
a digital pre-emphasis filter configured to receive the signal and to apply a distortion to the signal, wherein the signal is to be transmitted over the wireless network via the antenna;
a clipping module, coupled to the digital pre-emphasis filter, configured to limit complex magnitude of components of the signal that are above a predefined threshold;
a de-emphasis filter, coupled to the clipping module, configured to reduce out-of-band emissions of the signal caused by the clipping module, and reverse in-band distortion of the signal caused by the digital pre-emphasis filter; and
a digital to analog converter, coupled to the de-emphasis filter, to convert the signal after de-emphasis of the signal by the de-emphasis filter.

14. The system of claim 13, wherein a frequency response of the digital pre-emphasis filter is based on a frequency response of the de-emphasis filter.

15. The system of claim 14, wherein a frequency response of the de-emphasis filter combined with a frequency response of the digital pre-emphasis filter results in a flat composite frequency response of the transmitter within the frequency band.

16. The system of claim 14, wherein the digital pre-emphasis filter is configured to apply the distortion to the signal by multiplication of the signal with a transfer function in a frequency domain.

* * * * *